United States Patent
Aflaki Beni et al.

(10) Patent No.: US 12,069,314 B2
(45) Date of Patent: Aug. 20, 2024

(54) APPARATUS, A METHOD AND A COMPUTER PROGRAM FOR VOLUMETRIC VIDEO

(71) Applicant: Nokia Technologies Oy, Espoo (FI)

(72) Inventors: Payman Aflaki Beni, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 181 days.

(21) Appl. No.: 17/641,898

(22) PCT Filed: Aug. 26, 2020

(86) PCT No.: PCT/FI2020/050553
§ 371 (c)(1),
(2) Date: Mar. 10, 2022

(87) PCT Pub. No.: WO2021/053262
PCT Pub. Date: Mar. 25, 2021

(65) Prior Publication Data
US 2022/0329871 A1    Oct. 13, 2022

(30) Foreign Application Priority Data

Sep. 20, 2019   (FI) .................................. 20195787

(51) Int. Cl.
*H04N 19/80*     (2014.01)
*H04N 19/597*    (2014.01)
*H04N 19/70*     (2014.01)

(52) U.S. Cl.
CPC ........... *H04N 19/80* (2014.11); *H04N 19/597* (2014.11); *H04N 19/70* (2014.11)

(58) Field of Classification Search
CPC .... H04N 19/167; H04N 19/46; H04N 19/597; H04N 19/70; H04N 19/80; H04N 19/85;
(Continued)

(56) References Cited

U.S. PATENT DOCUMENTS

| 2012/0039383 A1* | 2/2012 | Huang | H04N 19/46 |
| | | | 375/E7.076 |
| 2013/0243104 A1* | 9/2013 | Chen | H04N 19/439 |
| | | | 375/240.29 |
| 2014/0016913 A1 | 1/2014 | Hamada | 386/278 |

FOREIGN PATENT DOCUMENTS

| EP | 1746839 A1 * | 1/2007 | ........... H04N 19/117 |
| WO | WO-2013065673 A1 * | 5/2013 | ............. H04N 19/11 |

(Continued)

OTHER PUBLICATIONS

ISO/IEC JTC 1/SC 29/WG 11, N 18487, "V-PCC Codec Description", 3DG, Jul. 1, 2019, 47 pgs.
(Continued)

*Primary Examiner* — Behrooz M Senfi
(74) *Attorney, Agent, or Firm* — Harrington & Smith

(57) ABSTRACT

A method including projecting a 3D representation of at least one object onto at least one 2D patch; generating a geometry image, a texture image, an occupancy map and auxiliary patch information from 5 the 2D patch, wherein the auxiliary patch information includes metadata indicating whether a filtering process shall be applied on said 2D patch upon reconstruction of the 3D representation of said at least one object; and encoding the auxiliary patch information and zero or more of the following: the geometry image, the texture image and the 10 occupancy map in or along a bitstream.

15 Claims, 5 Drawing Sheets

(58) Field of Classification Search
CPC ........... H04N 21/2343; H04N 21/4318; H04N 21/4728; H04N 21/816; H04N 21/854; H04N 19/126; H04N 19/136; H04N 19/176; H04N 19/98
USPC .................................................. 375/240.29
See application file for complete search history.

(56) References Cited

FOREIGN PATENT DOCUMENTS

| WO | WO 2018/169176 A1 | 9/2018 | | |
|---|---|---|---|---|
| WO | WO 2019/070686 A1 | 4/2019 | | |
| WO | WO 2019/129923 A1 | 7/2019 | | |
| WO | WO-2019129923 A1 * | 7/2019 | ............. | G06T 15/20 |

OTHER PUBLICATIONS

ISO/IEC JTC1/SC29/WG11 MPEG2019/m49414, "Volumetric Tiling Information SEI message for V-PCC", Apple, Jul. 2019, 5 pgs.

* cited by examiner

APPARATUS, A METHOD AND A COMPUTER PROGRAM FOR VOLUMETRIC VIDEO

CROSS REFERENCE TO RELATED APPLICATION

This patent application is a U.S. National Stage application of International Patent Application Number PCT/FI2020/050553 filed Aug. 26, 2020, which is hereby incorporated by reference in its entirety, and claims priority to FI 20195787 filed Sep. 20, 2019.

TECHNICAL FIELD

The present invention relates to an apparatus, a method and a computer program for volumetric video coding.

BACKGROUND

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. In dense point clouds or voxel arrays, the reconstructed 3D scene may contain tens or even hundreds of millions of points. One way to compress a time-varying volumetric scene/object is to project 3D surfaces to some number of pre-defined 2D planes. Regular 2D video compression algorithms can then be used to compress various aspects of the projected surfaces. For example, MPEG Video-Based Point Cloud Coding (V-PCC) provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

However, in many embodiments, it may be desirable or even required that a part of the content would be blurred or hidden upon reconstructing the content to be displayed to the end user. For example, the playback device of the end user may have limitations for displaying the content, or some parts of the content may be defined as confidential. Nevertheless, there are currently no tools for indicating a different processing, such as blurring or hiding, for a subset of patches upon reconstructing the content.

SUMMARY

Now, an improved method and technical equipment implementing the method has been invented, by which the above problems are alleviated. Various aspects include a method, an apparatus and a computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a method comprising projecting a 3D representation of at least one object onto at least one 2D patch; generating auxiliary patch information and zero or more of the following: a geometry image, a texture image and an occupancy map, from the 2D patch, wherein the auxiliary patch information comprises metadata indicating whether a filtering process shall be applied on said 2D patch upon reconstruction of the 3D representation of said at least one object; and encoding the auxiliary patch information and zero or more of the following: the geometry image, the texture image and the occupancy map in or along a bitstream.

An apparatus according to a second aspect comprises at least one processor and at least one memory, said at least one memory stored with computer program code thereon, the at least one memory and the computer program code configured to, with the at least one processor, cause the apparatus at least to perform: project a 3D representation of at least one object onto at least one 2D patch; generate auxiliary patch information and zero or more of the following: a geometry image, a texture image and an occupancy map, from the 2D patch, wherein the auxiliary patch information comprises metadata indicating whether a filtering process shall be applied on said 2D patch upon reconstruction of the 3D representation of said at least one object; and encode the auxiliary patch information and zero or more of the following: the geometry image, the texture image and the occupancy map in or along a bitstream.

An apparatus according to a third aspect comprises: means for projecting a 3D representation of at least one object onto at least one 2D patch; means for generating auxiliary patch information and zero or more of the following: a geometry image, a texture image and an occupancy map, from the 2D patch, wherein the auxiliary patch information comprises metadata indicating whether a filtering process shall be applied on said 2D patch upon reconstruction of the 3D representation of said at least one object; and means for encoding the auxiliary patch information and zero or more of the following: the geometry image, the texture image and the occupancy map in or along a bitstream.

According to an embodiment, the metadata further comprises a type and strength of the filtering to be applied.

According to an embodiment, at least one common filter type and a predefined filter strength is defined for a plurality of patches.

According to an embodiment, the signalling of the at least one common filter type and the predefined filter strength is configured to be carried out by at least two syntax elements included in a sequence level syntax structure.

According to an embodiment, at least one filter type and a predefined filter strength is defined patch-specifically.

According to an embodiment, the signalling of the at least one filter type and the predefined filter strength is configured to be carried out by at least two syntax elements included in a packet data unit (pdu) level syntax structure.

A method according to a fourth aspect comprises receiving a bitstream in a decoder, said bitstream comprising at least an encoded auxiliary patch information from a 2D patch, wherein the auxiliary patch information comprises metadata indicating whether a filtering process shall be applied on said 2D patch upon reconstruction of a 3D representation of at least one object; receiving, either in said bitstream or in a further bitstream, an encoded geometry image, an encoded texture image and an encoded occupancy map from said 2D patch; decoding the geometry image, the texture image, the occupancy map and the auxiliary patch information; and reconstructing a 3D representation of said at least one object based on the decoded geometry image, texture image, occupancy map and the auxiliary patch information, wherein application of the filtering process is controlled by said metadata.

An apparatus according to a fifth aspect comprises at least one processor and at least one memory, said at least one memory stored with computer program code thereon, the at least one memory and the computer program code configured to, with the at least one processor, cause the apparatus at least to perform: receive a bitstream in a decoder, said bitstream comprising at least an encoded auxiliary patch information from a 2D patch, wherein the auxiliary patch information comprises metadata indicating whether a filtering process shall be applied on said 2D patch upon reconstruction of a 3D representation of at least one object; receive, either in said bitstream or in a further bitstream, an encoded geometry image, an encoded texture image and an encoded occupancy map from said 2D patch; decode the geometry image, the texture image, the occupancy map and the auxiliary patch information; and reconstruct a 3D representation of said at least one object based on the decoded geometry image, texture image, occupancy map and the auxiliary patch information, wherein application of the filtering process is controlled by said metadata.

An apparatus according to a sixth aspect comprises: means for receiving a bitstream in a decoder, said bitstream comprising at least an encoded auxiliary patch information from a 2D patch, wherein the auxiliary patch information comprises metadata indicating whether a filtering process shall be applied on said 2D patch upon reconstruction of a 3D representation of at least one object; means for receiving, either in said bitstream or in a further bitstream, an encoded geometry image, an encoded texture image and an encoded occupancy map from said 2D patch; means for decoding the geometry image, the texture image, the occupancy map and the auxiliary patch information; and means for reconstructing a 3D representation of said at least one object based on the decoded geometry image, texture image, occupancy map and the auxiliary patch information, wherein application of the filtering process is controlled by said metadata.

According to an embodiment, the apparatus further comprises means for applying, in response to said metadata indicating that the filtering process shall be applied, said filtering process on said 2D patch either along the decoding of the texture image or along the reconstruction of the 3D representation of said at least one object.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

Figure 1A:
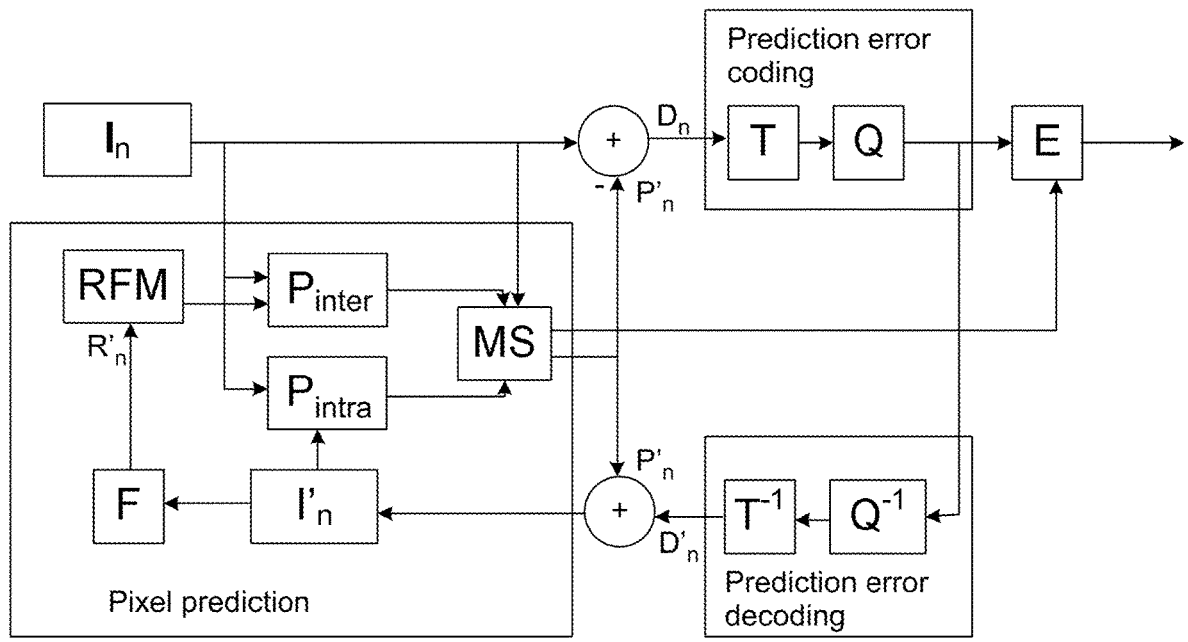
FIGS. 1a and 1b show an encoder and decoder for encoding and decoding 2D pictures.

In the following, several embodiments of the invention will be described in the context of point cloud models for volumetric video coding. It is to be noted, however, that the invention is not limited to specific scene models or specific coding technologies. In fact, the different embodiments have applications in any environment where coding of volumetric scene data is required.

A video codec comprises an encoder that transforms the input video into a compressed representation suited for storage/transmission, and a decoder that can uncompress the compressed video representation back into a viewable form. An encoder may discard some information in the original video sequence in order to represent the video in a more compact form (i.e. at lower bitrate).

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or inter-changed between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be pro-jected onto one, or more, geometries. These geometries may be "unfolded" or packed onto 2D planes (two planes per geometry: one for texture, one for depth), which are then encoded using standard 2D video compression technologies. Relevant projection geometry information may be transmit-ted alongside the encoded video files to the decoder. The decoder decodes the video and performs the inverse projec-tion to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

Figure 1B:
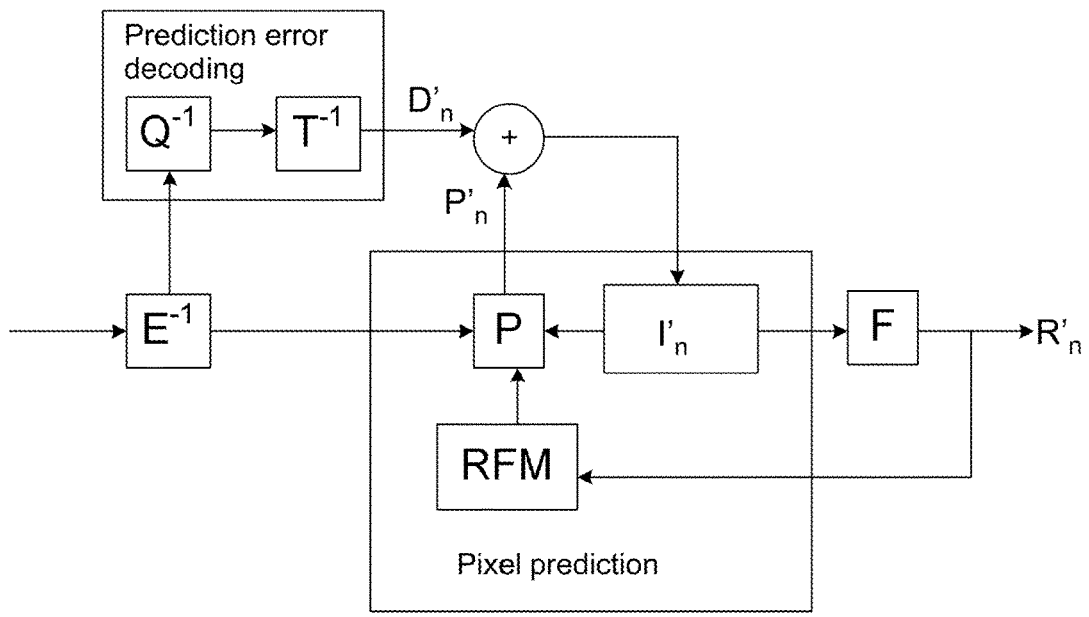

FIGS. 1a and 1b show an encoder and decoder for encoding and decoding the 2D texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 1a. FIG. 1a illustrates an image to be encoded (I″); a predicted representation of an image block (P′″); a prediction error signal (D″); a reconstructed predic-tion error signal (D′″); a preliminary reconstructed image (I′″); a final reconstructed image (R′″); a transform (T) and inverse transform (T$^{-1}$); a quantization (Q) and inverse quantization (Q$^{-1}$); entropy encoding (E); a reference frame memory (RFM); inter prediction (P$_{inter}$); intra prediction (P$_{intra}$); mode selection (MS) and filtering (F).

An example of a decoding process is illustrated in FIG. 1b. FIG. 1b illustrates a predicted representation of an image block (P′″); a reconstructed prediction error signal (D′″); a preliminary reconstructed image (I′″); a final reconstructed image (R′″); an inverse transform (T$^{-1}$); an inverse quanti-zation (Q$^{-1}$); an entropy decoding (E$^{-1}$); a reference frame memory (RFM); a prediction (either inter or intra) (P); and filtering (F).

Many hybrid video encoders encode the video informa-tion in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accu-racy of the pixel representation (picture quality) and size of the resulting coded video representation (file size or trans-mission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Many video encoders partition a picture into blocks along a block grid. For example, in the High Efficiency Video Coding (HEVC) standard, the following partitioning and definitions are used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-adaptive variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

An attribute picture may be defined as a picture that comprises additional information related to an associated texture picture. An attribute picture may for example comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture image and texture picture may be used interchangeably. Terms geometry image and geometry picture may be used interchangeably. A specific type of a geometry image is a depth image. Embodiments described in relation to a geometry image equally apply to a depth image, and embodiments described in relation to a depth image equally apply to a geometry image. Terms attribute image and attribute picture may be used interchangeably. A geometry picture and/or an attribute picture may be treated as an auxiliary picture in video/image encoding and/or decoding.

Figure 2A:
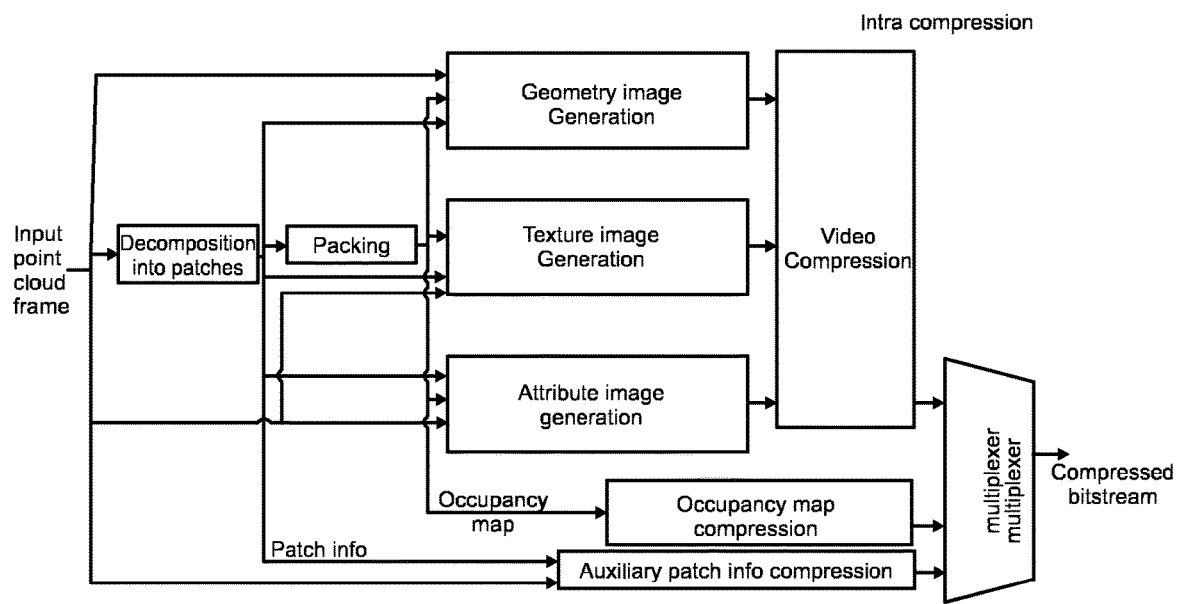
FIGS. 2a and 2b show a compression and a decompression process for 3D volumetric video.
Figure 2B:
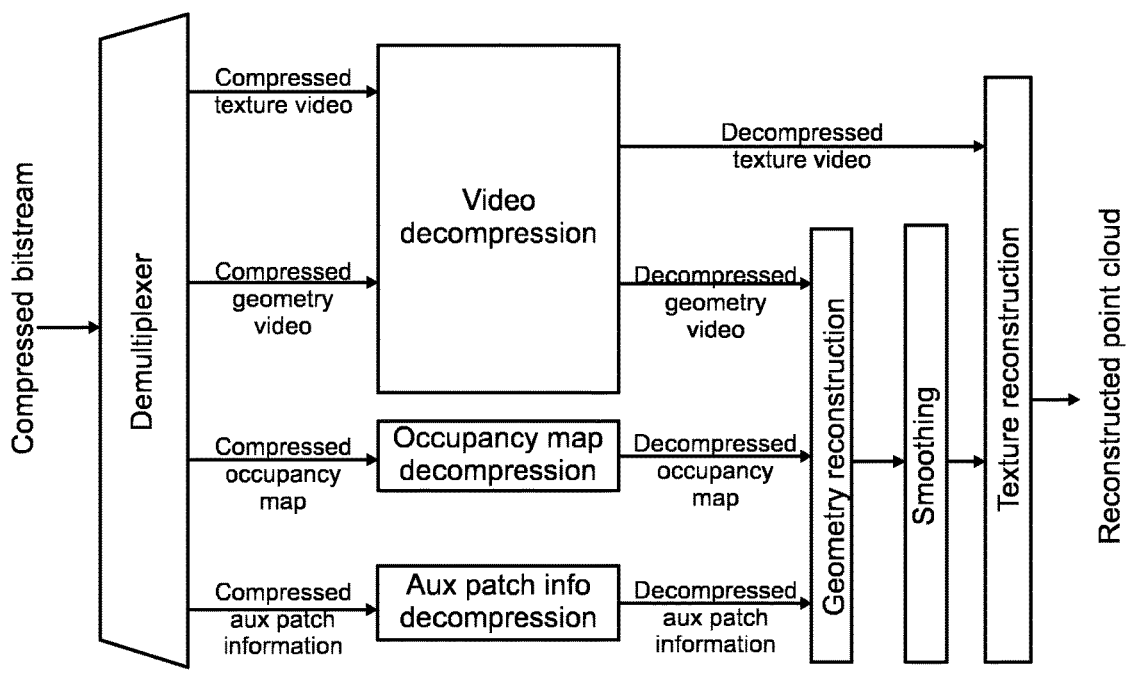

FIGS. 2a and 2b illustrate an overview of exemplified compression/decompression processes. The processes may be applied, for example, in Point Cloud Coding (PCC) according to MPEG standard. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

Figure 3A:
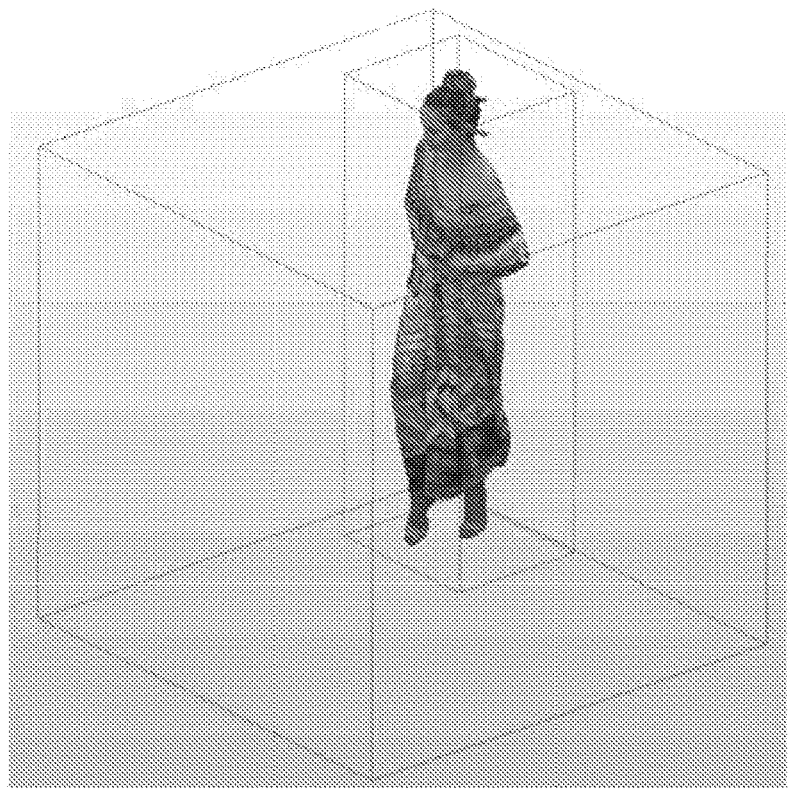
FIGS. 3a and 3b show an example of a point cloud frame and a projection of points to a corresponding plane of a point cloud bounding box.

Each point cloud frame represents a dataset of points within a 3D volumetric space that has unique coordinates and attributes. An example of a point cloud frame is shown on FIG. 3a.

The patch generation process decomposes the point cloud frame by converting 3d samples to 2d samples on a given projection plane using a strategy that provides the best compression. The patch generation process aims at decomposing the point cloud into a minimum number of patches with smooth boundaries, while also minimizing the reconstruction error. In the V-PCC test model TMC2v0, the following approach is implemented.

First, the normal per each point is estimated and the tangent plane and its corresponding normal are defined per each point, based on the point's nearest neighbours m within a predefined search distance. A K-D tree is used to separate the data and find neighbours in a vicinity of a point $p_i$ and a barycenter $c=\bar{p}$ of that set of points is used to define the normal. The barycenter c is computed as follows:

$$c = \bar{p} = \frac{1}{m}\sum_{i=1}^{m} p_i$$

The normal is estimated from eigen decomposition for the defined point cloud as:

$$\sum_{i=1}^{m}(p_i - \bar{p})(p_i - \bar{p})^T$$

Based on this information each point is associated with a corresponding plane of a point cloud bounding box. Each plane is defined by a corresponding normal $\vec{n}_{p_{idx}}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0).
More precisely, each point is associated with the plane that has the closest normal (i.e., maximizes the dot product of the point normal $\vec{n}_{p_i}$ and the plane normal $\vec{n}_{p_{idx}}$.

$$\max_{p_{idx}}\{\vec{n}_{p_i} \cdot \vec{n}_{p_{idx}}\}$$

Figure 3B:
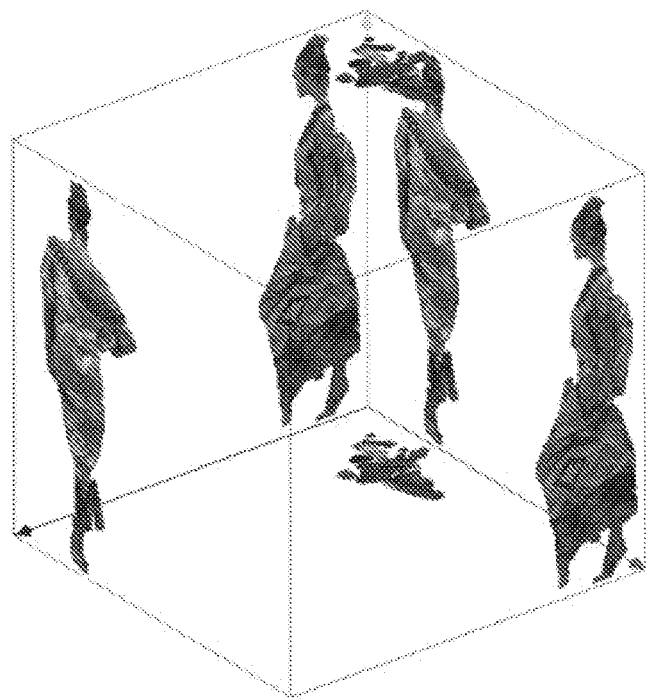

The sign of the normal is defined depending on the point's position in relationship to the "center". The projection estimation description is shown in FIG. 3b.

The initial clustering is then refined by iteratively updating the cluster index associated with each point based on its normal and the cluster indices of its nearest neighbors. The next step consists of extracting patches by applying a connected component extraction procedure.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

TMC2v0 uses a simple packing strategy that iteratively tries to insert patches into a W×H grid. W and H are user defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid is temporarily doubled and search is applied again. At the end of the process, H is clipped so as to fit the used grid cells.

The image generation process exploits the 3D to 2D mapping computed during the packing process to store the geometry and texture of the point cloud as images. In order to better handle the case of multiple points being projected to the same pixel, each patch is projected onto two images, referred to as layers. More precisely, let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+Δ], where Δ is a user-defined parameter that describes the surface thickness.

The generated videos have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points.

The padding process aims at filling the empty space between patches in order to generate a piecewise smooth image suited for video compression. TMC2v0 uses a simple padding strategy, which proceeds as follows:

Each block of T×T (e.g., 16×16) pixels is processed independently.
If the block is empty (i.e., all its pixels belong to empty space), then the pixels of the block are filled by copying either the last row or column of the previous T×T block in raster order.
If the block is full (i.e., no empty pixels), nothing is done.
If the block has both empty and filled pixels (i.e. a so-called edge block), then the empty pixels are iteratively filled with the average value of their non-empty neighbors.

The generated images/layers are stored as video frames and compressed using a video codec.

In the auxiliary patch information compression, the following meta data is encoded/decoded for every patch:
Index of the projection plane
Index 0 for the normal planes (1.0, 0.0, 0.0) and (−1.0, 0.0, 0.0)
Index 1 for the normal planes (0.0, 1.0, 0.0) and (0.0, −1.0, 0.0)
Index 2 for the normal planes (0.0, 0.0, 1.0) and (0.0, 0.0, −1.0).
2D bounding box (u0, v0, u1, v1)
3D location (x0, y0, z0) of the patch represented in terms of depth δ0, tangential shift s0 and bi-tangential shift r0. According to the chosen projection planes, (δ0, s0, r0) are computed as follows:
Index 0, δ0=x0, s0=z0 and r0=y0
Index 1, δ0=y0, s0=z0 and r0=x0
Index 2, δ0=z0, s0=x0 and r0=y0
Also, mapping information providing for each T×T block its associated patch index is encoded as follows:
For each T×T block, let L be the ordered list of the indexes of the patches such that their 2D bounding box contains that block. The order in the list is the same as the order used to encode the 2D bounding boxes. L is called the list of candidate patches.
The empty space between patches is considered as a patch and is assigned the special index 0, which is added to the candidate patches list of all the blocks.
Let I be index of the patch to which belongs the current T×T block and let J be the position of I in L. Instead of explicitly encoding the index I, its position J is arithmetically encoded instead, which leads to better compression efficiency.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches.

The occupancy map compression leverages the auxiliary information described in previous section, in order to detect the empty T×T blocks (i.e., blocks with patch index 0). The remaining blocks are encoded as follows.

The occupancy map could be encoded with a precision of a B0×B0 blocks. B0 is a user-defined parameter. In order to achieve lossless encoding, B0 should be set to 1. In practice B0=2 or B0=4 result in visually acceptable results, while significantly reducing the number of bits required to encode the occupancy map. The generated binary image covers only a single colour plane. However, given the prevalence of 4:2:0 codecs, it may be desirable to extend the image with "neutral" or fixed value chroma planes (e.g. adding chroma planes with all sample values equal to 0 or 128, assuming the use of an 8-bit codec).

The obtained video frame is compressed by using a video codec with lossless coding tool support (e.g., AVC, HEVC RExt, HEVC-SCC).

Occupancy map is simplified by detecting empty and non-empty blocks of resolution T×T in the occupancy map and only for the non-empty blocks we encode their patch index as follows:
  A list of candidate patches is created for each T×T block by considering all the patches that contain that block.
  The list of candidates is sorted in the reverse order of the patches.
  For each block,
  If the list of candidates has one index, then nothing is encoded.
  Otherwise, the index of the patch in this list is arithmetically encoded.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P could be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

Consequently, V-PCC provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

However, in many embodiments, it may be desirable or even required that a part of the content would be blurred or hidden upon reconstructing the content to be displayed to the end user. For example, the playback device of the end user may have limitations for displaying the content, or some parts of the content may be defined as confidential. Nevertheless, there are currently no tools for indicating a different processing, such as blurring or hiding, for a subset of patches upon reconstructing the content.

In the following, an enhanced method for indicating a filtering process for volumetric 3D data will be described in more detail, in accordance with various embodiments.

Figure 4:
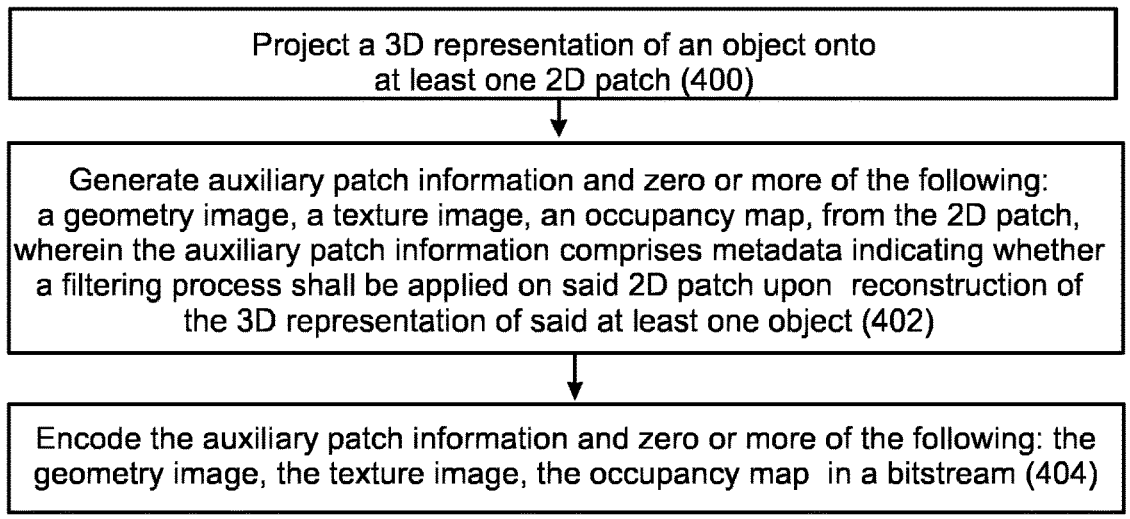
FIG. 4 shows a flow chart for metadata signaling for a filtering process according to an embodiment.

A starting point for the method may be considered, for example, that a 3D representation of at least one object, such as a point cloud frame or a 3D mesh, is input in an encoder. The method, which is disclosed in FIG. 4, comprises projecting (400) the 3D representation of the object (represented e.g. by a point cloud frame or a 3D mesh) onto at least one 2D patch; generating (402) auxiliary patch information and zero or more of the following: a geometry image, a texture image and an occupancy map, from the 2D patch, wherein the auxiliary patch information comprises metadata indicating whether a filtering process shall be applied on said 2D patch upon reconstruction of the 3D representation of said at least one object; and encoding (404) the auxiliary patch information and zero or more of the following: the geometry image, the texture image and the occupancy map in or along a bitstream.

Thus, the embodiments are especially applicable in scenes presented by several patches, where each patch presents a part of the scene. An object may be presented by a set of patches and any specific part of the image may be presented by a group of patches as well. The embodiments enable filtering of the patches based on the content presented by each patch. In other words, if the patch includes specific information of the scene that require to be filtered upon reconstruction for any reason, said patch is provided with metadata that enables a decoding device, such as a player or other unit(s) implementing the reconstruction process, to filter said patch. The metadata indicating whether a filtering process shall be applied may be implemented e.g. with a flag included in the auxiliary patch information, wherein the flag may provide a common indication for a plurality of patches, e.g. in a sequence level, or the flag may be patch-specific.

It is noted that "filtering" in this context may refer to blurring or any other type of filtering as well as enabling the display of the patch in general, i.e. an indication or an implication that the patch shall be displayed.

It is further noted that this aspect relates to the encoding of only the auxiliary patch information, which may be encoded into a separate bitstream, which may be stored or transmitted to a decoder as such. The geometry image, the texture image and the occupancy map may each be encoded into separate bitstreams, as well. Alternatively, the auxiliary patch information may be encoded into a common bitstream with one or more of the geometry image, the texture image or the occupancy map.

Figure 5:
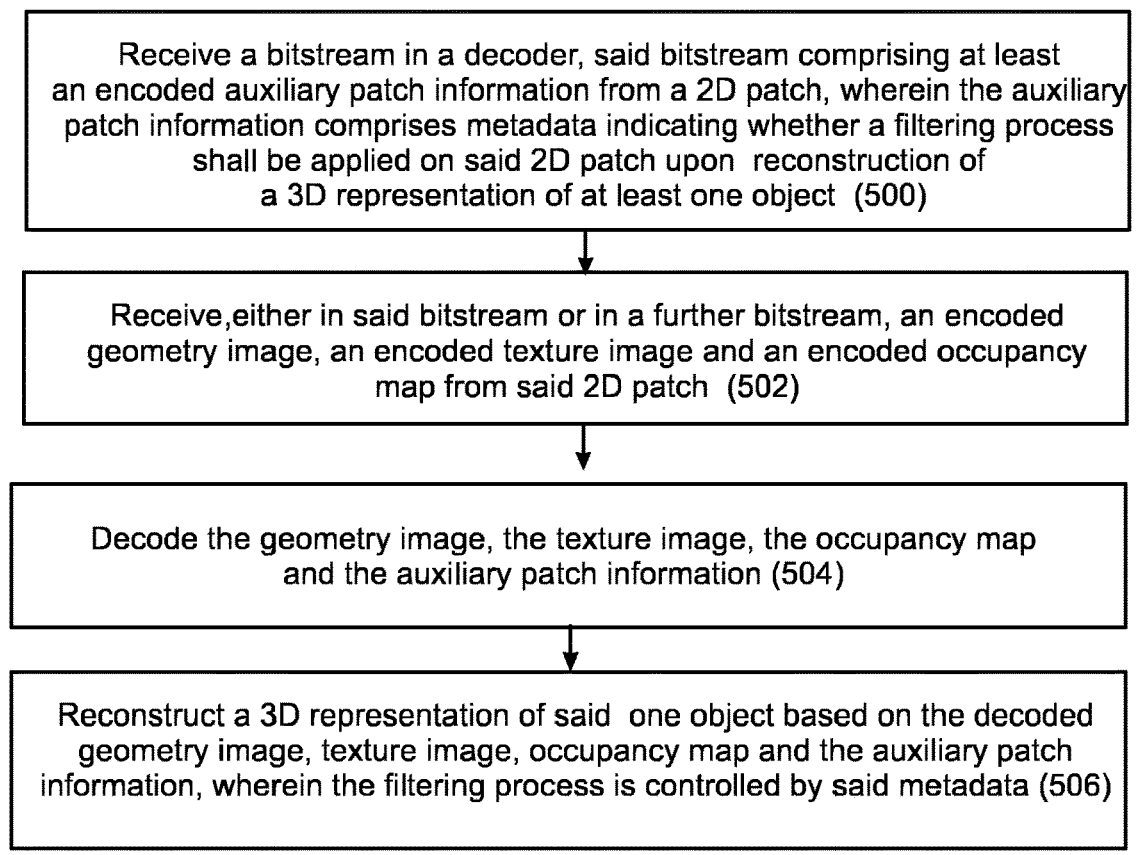
FIG. 5 shows a flow chart for applying filtering for patches based on the metadata signaling according to an embodiment.

Another aspect relates to the operation of a decoder. FIG. 5 shows an example of a decoding method comprising receiving (500) a bitstream in a decoder, said bitstream comprising at least an encoded auxiliary patch information from a 2D patch, wherein the auxiliary patch information comprises metadata indicating whether a filtering process shall be applied on said 2D patch upon reconstruction of a 3D representation of at least one object; receiving (502), either in said bitstream or in a further bitstream, an encoded geometry image, an encoded texture image and an encoded occupancy map from said 2D patch; decoding (504) the geometry image, the texture image, the occupancy map and the auxiliary patch information; and reconstructing (506) a 3D representation of said at least one object based on the decoded geometry image, texture image, occupancy map and auxiliary patch information, wherein application of the filtering process is controlled by said metadata.

Thus, the decoder receives and decodes the geometry image, texture image, occupancy map and auxiliary patch information of at least one 2D patch, received either in a common bitstream or in two or more separate bitstreams. From the auxiliary patch information, the decoder decodes, among other auxiliary patch information, also the metadata indicating whether a filtering process shall be applied on said 2D patch upon reconstruction of a 3D representation of at least one object. The 3D representation of one or more objects is then reconstructed based on the decoded geometry image, texture image, occupancy map and auxiliary patch information, wherein depending on said metadata the filtering process may or may not be applied to said 2D patch.

Figure 6A:
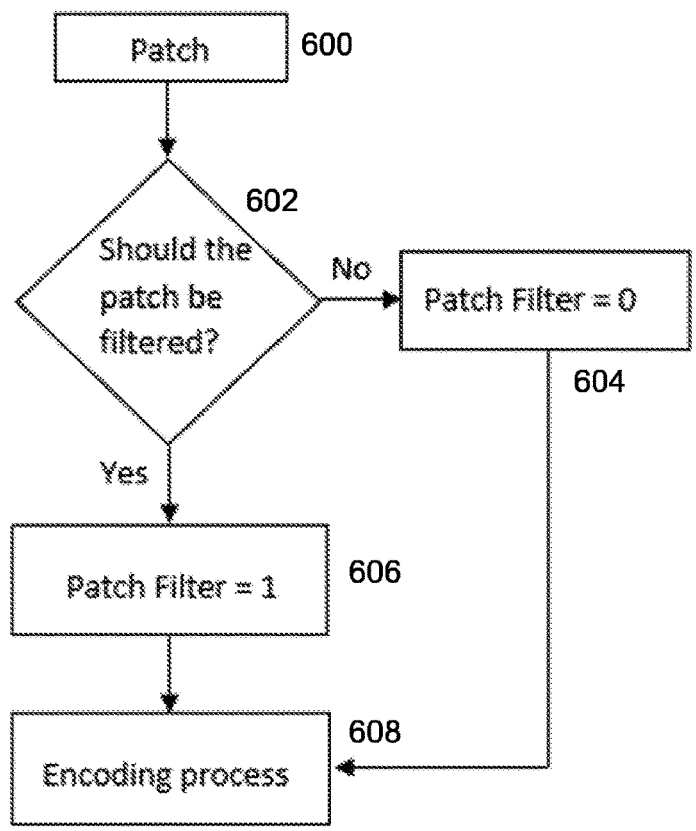
FIGS. 6a and 6b show some embodiments relating to the encoding and decoding of the metadata for a filtering process.
Figure 6B:
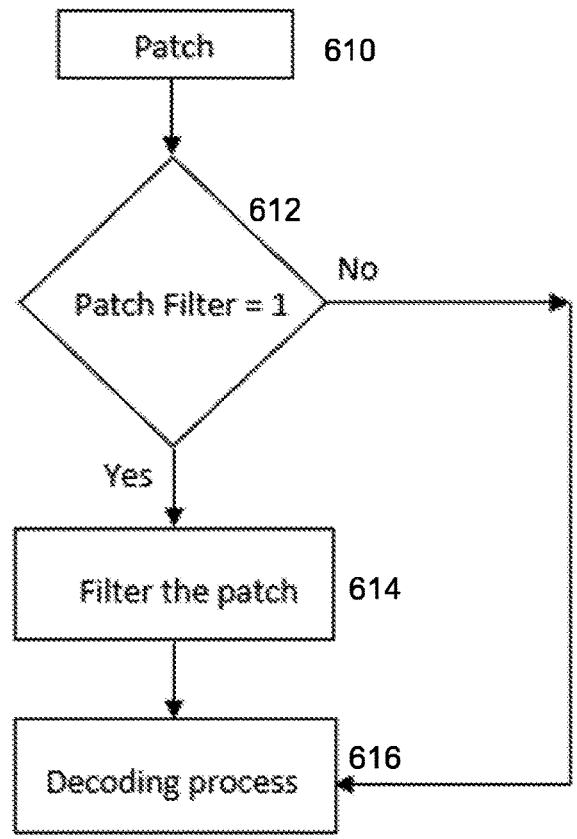

Some embodiments relating to the encoding and decoding aspects may be illustrated by the flow charts of FIGS. 6a and 6b. The operation of the encoder is shown in FIG. 6a, where a patch is input (600) in the encoder. It is examined if the patch includes any specific information of the scene that require to be filtered upon reconstruction for any reason, and thereafter a decision is made (602), if a filtering process should be applied to said patch. In this example, the metadata is indicated by a patch filter flag, which is set to zero, if no filtering process shall be applied (604) or the flag is set to one, if a filtering process shall be applied (606). Then the flag is included in the auxiliary patch information to be encoded (608) in a bitstream. The encoded bitstream comprising the auxiliary patch information may be stored or transmitted as such, or the auxiliary patch information may be encoded in or along a bitstream comprising at least one of the geometry image, the texture image and/or the occupancy map.

The operation of the decoder is shown in FIG. 6b, where an encoded patch is input (610) in the encoder. It is examined if the patch is provided with a patch filter flag and if yes, what is the value of the flag (612). If the value of the flag is zero, no filtering is applied, and the patch is input directly into a decoding process (616). If the value of the flag is one, a filtering process is applied to the patch (614) and a decoding process (616) may be applied to the patch before, after or along the filtering process (614).

According to an embodiment, the method further comprises applying said filtering process on said 2D patch either along the decoding of the texture image or along the reconstruction of the 3D representation of said at least one object.

Thus, the filtering may be applied on the 2D attribute (e.g. colour texture) patch, i.e. before 3D reconstruction, or on the reconstructed point cloud in 3D space. The first option allows for faster implementation and also protects the content in the decoded 2D video. The second option provides a higher quality in 3D space.

According to an embodiment, the metadata further comprises a type and strength of the filtering to be applied.

It is noted that there may be a default setting of the filtering for each content, wherein the filtering may include a specific type of filtering with a pre-defined strength level. In such embodiment, only a single flag bit per patch or a plurality of patches will be signaled, indicating whether or not the filtering is to be applied on each patch. The default setting of the filtering for each content may be communicated with decoder for a specific duration of time e.g. a Group Of Pixels (GOP) or for any object separately or for a specific spatial region/volume of the content. This information may be communicated in advance and used upon receiving the corresponding per patch signal.

However, defining the type and strength of the filtering to be applied provides more versatile options for determining the filtering process differently in accordance with the requirements of the application or the content creator for respective patches.

For example, the patches which represent a specific object, or a specific part of the scene may be selected in the encoder side based on several different criteria which include but are not limited to the following:

- Regions of interest or other parts of the scene which may require different treatment from presentation point of view for the end user, such as faces, plate numbers, documents, etc. This also includes the cases where some part of the scene is to be presented so that the content is not perceivable to the end user.
- Closeness to the camera e.g. patches representing the objects which are farther away from camera are given different type of filters compared to the patches representing the objects which are closer to the camera.
- Amount of High Frequency Components (HFCs) of patches i.e. the patches with different amount of HFCs may be given different type of filers according to the needs of the application.
- Motion of patches i.e. the temporal information of each object is taken into account and the patches representing the objects with higher motion are given different type of filters as compared to the patches which are representing the objects with lower motion.
- Confidential parts of the scene selected by the capturing director or the content creator. Accordingly, the confidential parts of the scene are to be filtered, thereby disabling the end user to perceive them while still providing a general understanding of the content since most of the scene is presented normally.

According to an embodiment, the filtering process enabled for each patch may include several different types of filtering. The filtering method may include, but is not limited to, one or more of the following methods:

- Blurring filter for blurring the content so that the content is not perceivable to the end user. Various blur filter kernels, such as gaussian filter kernels, may be supported.
- Display/no display signal. This filter will remove the content of the patch completely from the presentation while keeping the rest of the content presented conventionally.
- Engraving filter for filtering modern photos into an old-style engraved print look.

Black and white filter for removing the color of the patches and presenting them in grey scale to the end user.

High pass filter that can present the image with its contours and removes all the content which are not aligned with the contours.

Bathroom glass effect, that discreetly hides the content of your patch in a similar presentation as blurring filter but with a different presentation.

Transparency filter, which makes the content transparent to some extent or some percentage that is defined in the encoder and communicated with decoder.

Pastel filter that turns the image to a delicate pastel art.

Tile filtering for creating a tiled version of the content.

Old film effect, which turns the content of patches into old film presentation.

Segmentation filter for segmenting the patch to different segments prior to presentation to the end user.

Motion blur for blurring the motion, if present, in the respective patches for consecutive temporal patches.

Pencil effect filter, which turns the patch content to a pencil like sketch.

Noise effect, which adds random noise (high frequency noise) to the patch content A combination of any of afore-mentioned filters.

According to an embodiment, the strength of each filter and/or effect is communicated to the decoder. Thus, the decoder is enabled to reconstruct the patch with the desired filter strength and presentation. Some non-limiting examples of strength parameters for some of the above-mentioned filters are described below:

Blurring filter: The level of blurring effect to be applied may be communicated to vary from very light blurring effect to severe blurring effect, e.g. having any value between 0-100%.

High pass filter: It may be controlled to preserve only strong contours or alternatively any contour in the patch. This depends on the strength of the high pass filter and how strongly it removes the non-contour parts of the patch.

Bathroom glass effect: It may vary between applying a slight effect on the content and changing the presentation of the patch completely, depending e.g. on the used application.

Transparency filter: It may vary from 0% to 100% transparency depending on the strength of the filter.

Tile filtering: It may vary the size of the tiles and the orientation and shape of the tiles, which are indicated to the decoder.

Segmentation filter: It may define the number of segments and the type of segmentation that may follow many different segmentation algorithms.

Noise effect: It may define the amount of noise to be added and type of the noise, which are indicated to the decoder. E.g gaussian noise may be added so that the quality of the content is not dropped more than 2 db in PSNR objective metric evaluation.

As mentioned above, a common filter type and a predefined filter strength may be defined for any specific embodiment, in a sequence level, wherein for such embodiments, there is no need to provide such information in patch level. Alternatively, information about the filtering process may be defined in a patch level and therefore, in the encoder side, each patch is given a flag e.g. patch_filter_flag where when patch_filter_flag=0 no filter is to be applied on the patch and when patch_filter_flag=1 then the patch is expected to be filtered. If the value of patch_filter_flag is equal to 1, then the type and strength of the filter may be indicated as well.

According to an embodiment, a default filter type and a default filter strength may be defined to be considered as the base filter strength for all patches. Following this, for each patch, only the difference between the needed strength compared to the said base filter strength may be communicated for each patch, targeting less required bits to represent the filter strength.

The auxiliary information bit stream syntax of V-PCC is disclosed in the document MPEG N18180, also referred to as ISO/IEC 23090-5:2018(E) "Study of CD". According to an embodiment, said one or more indicators defining a common filter type and a predefined filter strength for a plurality of patches are introduced in attribute_information syntax element of MPEG N18180.

According to an embodiment, syntax elements, which may be referred to as global_filter_type and global_filter_strength are added to attribute_information or any other suitable syntax structure for ISO/IEC 23090-5 (or similar volumetric video coding technology). Moreover, syntax elements, which may be referred to as global_filter_kernel and global_filter_support, may also be added to attribute_information syntax structure in order to signal further parameters for the filter. Table 1 shows an example of including said syntax elements into attribute_information syntax element.

TABLE 1

| (ISO/IEC 23090-5 example) | |
|---|---|
| attribute_information( ) { | Descriptor |
|   ai_attribute_count | u(7) |
|   for( i = 0; i < ai_attribute_count; i++ ) { | |
|     ai_attribute_type_id[ i ] | u(4) |
|     ai_attribute_codec_id[ i ] | u(8) |
|     if( sps_pcm_separate_video_present_flag) | |
|       ai_pcm_attribute_codec_id[ attributeindex ] | u(8) |
|     ai_attribute_dimension_minus1[ i ] | |
|     if( ai_attribute_dimension_minus1[ i ] > 0) { | |
|       ai_attribute_dimension_partitions_minus1[ i ] | |
|       remainingDimensions = ai_attribute_dimension_minus1[ i ] | |
|       k = ai_attribute_dimension_partitions_minus1[ i ] | |
|       for( j = 0; j < k; j++) { | |
|         if(k - j == remainingDimensions ) | |
|           ai_attribute_partition_channels_minus1[ i ] [ j ] = 0 | |
|         else | |
|           ai_attribute_partition_channels_minus1[ i ][ j ] | ue(v) |

TABLE 1-continued (ISO/IEC 23090-5 example)

| attribute_information( ) { | Descriptor |
|---|---|
|     remainingDimensions −= ai_attribute_partition_channelsl_minusl[ i ] [ j ] + 1 | |
|     } | |
|     ai_attribute_partition_channels_minusl[ i ][ k ] = remainingDimensions | |
|     } | |
|     ai_attribute_nominal_2d_bitdepth_minusl[ i ] | u(5) |
|   } | |
|   if( ai_attribute_count > 0) { | |
|     ai_attribute_params_enabled_flag | |
|     ai_attribute_patch_params_enabled_flag | |
|     ai_attribute_MSB_align_flag | u(1) |
|     global_filter_type [ i ] | ae(v) |
|     global_filter_strength [ i ] | ae(v) |
|     global_filter_kernel [ i ] | ae(v) |
|     global_filter_support [ i ] | ae(v) |
|   } | |
| } | |

According to an embodiment, said one or more indicators defining a patch-specific filter type and filter strength are introduced in pdu_data_unit syntax element of MPEG N18180.

According to an embodiment, syntax elements, which may be referred to as patch_filter_flag, patch_filter_type and patch_filter_strength are added to a pdu_data_unit syntax element or any other suitable syntax structure for ISO/IEC 23090-5 (or similar volumetric video coding technology). Table 2 shows an example of including said syntax elements into pdu_data_unit syntax element.

TABLE 2

(ISO/IEC 23090-5 example)

| patch_data_unit( frmIdx, patchindex) { | Descriptor |
|---|---|
|   pdu_2d_shift_u[ frmIdx ] [ patchindex ] | ae(v) |
|   pdu_2d_shift_v[ frmIdx ] [ patchindex ] | ae(v) |
|   pdu_2d_delta_size_u[ frmIdx ] [ patchindex ] | ae(v) |
|   pdu_2d_delta_size_v[ frmIdx ] [ patchindex ] | ae(v) |
|   pdu_3d_shift_tangent_axis[ frmIdx ] [ patchindex ] | ae(v) |
|   pdu_3d_shift_bitangent_axis[ frmIdx ] [ patchindex ] | ae(v) |
|   pdu_3d_shift_normal_axis[ frmIdx ] [ patchindex ] | ae(v) |
|   pdu_normal_axis[ frmIdx ] [ patchindex ] | ae(v) |
|   iff pfh_patch_orientation_present_flag[ frmIdx ]) | |
|     pdu_orientation_swap_flag[ frmIdx ] [ patchindex ] | ae(v) |
|   iff pfh_lod_bit_count[ frmIdx ] > 0 ) | |
|     pdu_lod[ frmIdx ] [ patchindex ] | ae(v) |
|   patch_filter_flag [ frmIdx ] [ patchindex ] | u(1) |
|   iff patch_filter_flag [frmIdx] [patchindex]] | |
|     patch_filter_type [ frmIdx ] [ patchindex ] | ae(v) |
|     patch_filter_strength [ frmIdx ] [ patchindex ] | ae(v) |

In the above embodiments, one filter type and its strength parameter are defined either for a plurality of patches, e.g. in a sequence level, or for each patch separately. According to an embodiment, a plurality of filter types and their strength parameters may be defined either as common for a plurality of patches, e.g. in a sequence level, or for each patch separately.

According to an embodiment, a syntax element, which may be referred to as sps_num_global_filter is added to sequence_parameter_set or any other suitable syntax structure for ISO/IEC 23090-5 (or similar volumetric video coding technology). sps_num_global_filter indicates the number [1, j] of various filters available for the patches included in said sequence.

According to an embodiment, syntax elements, which may be referred to as global_filter_type[i] and global_filter_strength[i] are added to sequence_parameter_set or any other suitable syntax structure for ISO/IEC 23090-5 (or similar volumetric video coding technology). Herein, i=[1, j] identifies a specific filter and its parameters. Similarly, syntax elements, which may be referred to as global_filter_kernel[i] and global_filter_support[i], may also be added to sequence_parameter_set syntax structure in order to signal further parameters for the filters, as shown in Table 3.

TABLE 3

(ISO/IEC 23090-5 example)

| sequence_parameter_set( ) { | Descriptor |
|---|---|
|   profile_tier_level() | |
|   sps_sequence_parameter_set_id | u(4) |
|   sps_frame_width | u(16) |
|   sps_frame_height | u(16) |
|   sps_avg_frame_rate_present_flag | u(1) |
|   if( sps_avg_frame_rate_present_flag) | |
|     sps_avg_frame_rate | u(16) |
|   sps_enhanced_occupancy_map_for_depth_flag | u(1) |
|   sps_layer_count_minusl | u(1) |
|   if( sps_layer_count_minusl > 0) | |
|     sps_multiple_layer_streams_present_flag | u(1) |
|     sps_layer_absolute_coding_enabled_flag[ 0 ] = 1 | |
|     for(i = 0; i < sps_layer_count_minusl; i++) { | |
|       sps_layer_absolute_coding_enabled_flag[ i + 1 ] | u(1) |
|       if( sps_layer_absolute_coding_enabled_flag[ i + 1 ] = = 0) | |
|   { | |
|     if( i > 0) | |
|       sps_layer_predictor_index_diff[ i + 1 ] | ue(v) |
|     else | |
|       sps_layer_predictor_index_diff[ i + 1 ] = 0 | |
|     } | |
|   } | |
|   sps_pcm_patch_enabled_flag | |
|   if( sps_pcm_patch_enabled_flag) | |
|     sps_pcm_separate_video_present_flag | |
|   occupancy_information() | |
|   geometryjnformationf) | |
|   attributejnformationf) | |
|   sps_patch_inter_prediction_enabled_flag | |
|   sps_pixel_deinterleaving_flag | |
|   sps_point_local_reconstruction_enabled_flag | |
|   if( sps_point_local_reconstruction_enabled_flag) | |
|     point_local_reconstruction_information() | |
|   sps_remove_duplicate_point_enabled_flag | |
|   sps_45degree_projection_patch_enabled_flag | |
|   sps_patch_precedence_order_flag | u(1) |

TABLE 3-continued (ISO/IEC 23090-5 example)

| sequence_parameter_set( ) { | Descriptor |
|---|---|
|   sps_num_global_filters | u(8) |
|   for(i = 1; i < sps_num_global_filters; i++ ) { | |
|     global_filter_type [ i ] | ae(v) |
|     global_filter_strength [ i ] | ae(v) |
|     global_filter_kernel [ i ] | ae(v) |
|     global_filter_support [ i ] | ae(v) |
|   } | |
| } | |

According to an embodiment, a syntax element, which may be referred to as ai_attribute_filter_index[i] is added to attribute information or any other suitable syntax structure for ISO/IEC 23090-5 (or similar volumetric video coding technology). Thus, for indicating which one of the plurality of filters [1,j] indicated in the SPS syntax structure is to be selected for a plurality of patches, the ai_attribute_filter_index[i] syntax element may be used, as shown in Table 4. The filter indicated by the ai_attribute_filter_index[i] syntax element may be used for filtering a plurality of patches until a new filter is indicated by another index value.

TABLE 4

(ISO/IEC 23090-5 example)

| attribute_information( ) { | Descriptor |
|---|---|
|   ai_attribute_count | u(7) |
|   for( i = 0; i < ai_attribute_count; i++ ) { | |
|     ai_attribute_type_id[ i ] | u(4) |
|     ai_attribute_codec_id[ i ] | u(8) |
|     if( sps_pcm_separate_video_present_flag) | |
|       ai_pcm_attribute_codec_id[ attributeindex ] | u(8) |
|     ai_attribute_dimension_minus1[ i ] | |
|     if( ai_attribute_dimension_minus1[ i ] > 0) { | |
|       ai_attribute_dimension_partitions_minus1[ i ] | |
|       remainingDimensions = ai_attribute_dimension_minus1[ i ] | |
|       k = ai_attribute_dimension_partitions_minus1[ i ] | |
|       for( j = 0; j < k; j++) { | |
|         if(k j == remainingDimensions ) | |
|           ai_attribute_partition_channels_minus1[ i ] [ j ] = 0 | |
|         else | |
|           ai_attribute_partition_channels_minus1[ i ][ j ] | ue(v) |
|         remainingDimensions − | |
| = ai_attribute_partition_channels_minus1[ i ] [ j ] + 1 | |
|       } | |
|       ai_attribute_partition_channels_minus1[ i ][ k ] = remainingDimensions | |
|     } | |
|   ai_attribute_nominal_2d_bitdepth_minus1[ i ] | u(5) |
|   } | |
|   if( ai_attribute_count > 0) { | |
|     ai_attribute_params_enabled_flag | |
|     ai_attribute_patch_params_enabled_flag | |
|   ai_attribute_MSB_align_flag | u(1) |
|   iff sps_num_global_filters [ frmidx ] > 0 ) | |
|     ai_attribute_filter_index [ i ] | u(n) |
|   } | |
| } | |

According to an embodiment, a syntax element, which may be referred to as pdu_filter_index[i] is added to pdu_data_unit or any other suitable syntax structure for ISO/IEC 23090-5 (or similar volumetric video coding technology). Thus, for indicating which one of the plurality of filters [1,j] indicated in the SPS syntax structure is to be selected for a particular patch, the pdu_filter_index[i] syntax element may be used, as shown in Table 5. The filter indicated by the pdu_filter_index[i] syntax element is used only for the patch in question.

| patch_data_unit( frmIdx, patchindex) { | Descriptor |
|---|---|
|   pdu_2d_shift_u[ frmIdx ] [ patchindex ] | ae(v) |
|   pdu_2d_shift_v[ frmIdx ] [ patchindex ] | ae(v) |
|   pdu_2d_delta_size_u[ frmIdx ] [ patchindex ] | ae(v) |
|   pdu_2d_delta_size_v[ frmIdx ] [ patchindex ] | ae(v) |
|   pdu_3d_shift_tangent_axis[ frmIdx ] [ patchindex ] | ae(v) |
|   pdu_3d_shift_bitangent_axis[ frmIdx ] [ patchindex ] | ae(v) |
|   pdu_3d_shift_normal_axis[ frmIdx ] [ patchindex ] | ae(v) |
|   pdu_normal_axis[ frmIdx ] [ patchindex ] | ae(v) |
|   iff pfh_patch_orientation_present_flag[ frmIdx ]) | |
|     pdu_orientation_swap_flag[ frmIdx ] [ patchindex | ae(v) |
| ] | |
|   iff pfh_lod_bit_count[ frmIdx ] > 0 ) | |
|     pdulod frmidx ] [ patchindex ] | ae(v) |
|   iff sps_num_global_filters [ frmidx ] > 0 ) | |
|     pdu_filter_index [ frmidx ] [ patchindex ] | u(n) |

According to an embodiment, the patch filter flag from one temporal time stamp may be predicted from previous temporal time stamps following an object movement in the scene and based on that following the movement of the patch content. In other words, a patch representing an object which is assigned to have a specific filter, may receive the same information regarding enabling the filter and type/strength of the filter from previous patches representing the same object in the scene.

According to an embodiment, if two patches are associated with the same object in the scene, the filter information for a second patch may be predicted from the filter information of a first patch, i.e. enabling to specifically define the second patch to use a filter with same type and strength as of the filter information of the first patch.

According to another embodiment, if the patch filter information for two adjacent spatial locations in the scene, referred to as reference patches, are assigned specific values e.g. enabling the filter with same type of filter but having different filter strength, then the patch filter information of any patches between them (referred to as current patches) may also be predicted based on the patch filter information of the reference patches. This means, same filter type to be applied and the filter strength may be linearly or non-linearly changed according to the distance of current patch from reference patches.

In such embodiments where the filter is to set to not showing the patch, a prediction between patches, which may be performed either in spatial or temporal domain and which results in not showing the patch content, may provide faster reconstruction or decoding of the 3D content, since some patches are not to be decoded and/or reconstructed and/or displayed.

Two or more of the embodiments as described above may be combined, and they may be introduced as one or more indicators in any suitable syntax structure for ISO/IEC 23090-5 (or similar volumetric video coding technology).

Consequently, the embodiments as described herein enable to apply different filters for a subset of patches or each patch separately. Moreover, the embodiments enable to adjust the strength of the filter based on different applications in a patch level or for a subset of patches.

The embodiments relating to the encoding aspects may be implemented in an apparatus comprising: means for projecting a 3D representation of at least one object onto at least one 2D patch; means for generating auxiliary patch information and zero or more of the following: a geometry image, a texture image and an occupancy map from the 2D patch, wherein the auxiliary patch information comprises metadata indicating whether a filtering process shall be applied on said 2D patch upon reconstruction of the 3D representation of said at least one object; and means for encoding the auxiliary patch information and zero or more of the following: the geometry image, the texture image and the occupancy map in or along a bitstream.

The embodiments relating to the encoding aspects may likewise be implemented in an apparatus comprising at least one processor and at least one memory, said at least one memory stored with computer program code thereon, the at least one memory and the computer program code configured to, with the at least one processor, cause the apparatus at least to perform: project a 3D representation of at least one object onto at least one 2D patch; generate auxiliary patch information and zero or more of the following: a geometry image, a texture image and an occupancy map from the 2D patch, wherein the auxiliary patch information comprises metadata indicating whether a filtering process shall be applied on said 2D patch upon reconstruction of the 3D representation of said at least one object; and encode the auxiliary patch information and zero or more of the following: the geometry image, the texture image and the occupancy map in or along a bitstream.

The embodiments relating to the decoding aspects may be implemented in an apparatus comprising means for receiving a bitstream in a decoder, said bitstream comprising at least an encoded auxiliary patch information from a 2D patch, wherein the auxiliary patch information comprises metadata indicating whether a filtering process shall be applied on said 2D patch upon reconstruction of a 3D representation of at least one object; means for receiving, either in said bitstream or in a further bitstream, an encoded geometry image, an encoded texture image and an encoded occupancy map from said 2D patch; means for decoding the geometry image, the texture image, the occupancy map and the auxiliary patch information; and means for reconstructing a 3D representation of said at least one object based on the decoded geometry image, texture image, occupancy map and the auxiliary patch information, wherein application of the filtering process is controlled by said metadata.

The embodiments relating to the decoding aspects may likewise be implemented in an apparatus comprising at least one processor and at least one memory, said at least one memory stored with computer program code thereon, the at least one memory and the computer program code configured to, with the at least one processor, cause the apparatus at least to perform: receive a bitstream in a decoder, said bitstream comprising at least an encoded auxiliary patch information from a 2D patch, wherein the auxiliary patch information comprises metadata indicating whether a filtering process shall be applied on said 2D patch upon reconstruction of a 3D representation of at least one object; receive, either in said bitstream or in a further bitstream, an encoded geometry image, an encoded texture image and an encoded occupancy map from said 2D patch; decode the geometry image, the texture image, the occupancy map and the auxiliary patch information; and reconstruct a 3D representation of said at least one object based on the decoded geometry image, texture image, occupancy map and the auxiliary patch information, wherein application of the filtering process is controlled by said metadata.

Such apparatuses may comprise e.g. the functional units disclosed in any of the FIGS. 1a, 1b, 2a and 2b for implementing the embodiments.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, where the example embodiments have been described with reference to an encoder or an encoding method, it needs to be understood that the resulting bitstream and the decoder or the decoding method may have corresponding elements in them. Likewise, where the example embodiments have been described with reference to a decoder, it needs to be understood that the encoder may have structure and/or computer program for generating the bitstream to be decoded by the decoder.

In the above, some embodiments have been described with reference to encoding or decoding texture pictures, geometry pictures, (optionally) attribute pictures and auxiliary patch information into or from a single bitstream. It needs to be understood that embodiments can be similarly realized when encoding or decoding texture pictures, geometry pictures, (optionally) attribute pictures and auxiliary patch information into or from several bitstreams that are associated with each other, e.g. by metadata in a container file or media presentation description for streaming.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. A method comprising:
projecting a three-dimensional representation of at least one object onto at least one two-dimensional patch;
generating auxiliary patch information and one or more of the following:
 a geometry image,
 a texture image, or
 an occupancy map,
from the two-dimensional patch, wherein the auxiliary patch information comprises metadata indicating whether a filtering process shall be applied on said two-dimensional patch upon reconstruction of the three-dimensional representation of said at least one object, wherein the metadata further comprises at least one filter type and a predefined filter strength that is defined patch-specifically; and
encoding the auxiliary patch information and the one or more of:
 the geometry image,
 the texture image, or
 the occupancy map
in or along a bitstream, wherein signaling of the at least one filter type and the predefined filter strength is configured to be carried via at least two syntax elements included in a packet data unit level syntax structure.

2. An apparatus comprising:
at least one processor; and
at least one non-transitory memory, said at least one memory stored with computer program code thereon,
the at least one memory and the computer program code configured to, with the at least one processor, cause the apparatus at least to perform:
 project a three-dimensional representation of at least one object onto at least one two-dimensional patch;
 generate auxiliary patch information and one or more of the following:
  a geometry image,
  a texture image or
  an occupancy map,
 from the two-dimensional patch, wherein the auxiliary patch information comprises metadata indicating whether a filtering process shall be applied on said two-dimensional patch upon reconstruction of the three-dimensional representation of said at least one object, wherein the metadata further comprises at least one filter type and a predefined filter strength that is defined patch-specifically; and
 encode the auxiliary patch information and the one or more of:
  the geometry image,
  the texture image, or
  the occupancy map
 in or along a bitstream, wherein signaling of the at least one filter type and the predefined filter strength is configured to be carried via at least two syntax elements included in a packet data unit level syntax structure.

3. The apparatus according to claim 2, wherein the metadata further comprises at least one common filter type and a further predefined filter strength that is defined for a plurality of patches.

4. The apparatus according to claim 3, wherein signalling of the at least one common filter type and the further predefined filter strength is configured to be carried via at least two syntax elements included in a sequence level syntax structure.

5. A method comprising:
receiving a bitstream in a decoder, said bitstream comprising at least an encoded auxiliary patch information from a two-dimensional patch, wherein the encoded auxiliary patch information comprises metadata indicating whether a filtering process shall be applied on said two-dimensional patch upon reconstruction of a three-dimensional representation of at least one object, wherein the metadata further comprises at least one filter type and a predefined filter strength that is defined patch-specifically, wherein signaling of the at least one filter type and the predefined filter strength is carried via at least two syntax elements included in a packet data unit level syntax structure;
receiving, either in said bitstream or in a further bitstream, an encoded geometry image, an encoded texture image and an encoded occupancy map from said two-dimensional patch;
decoding the geometry image, the texture image, the occupancy map and the encoded auxiliary patch information; and
reconstructing the three-dimensional representation of said at least one object based on the decoded geometry image, texture image, occupancy map and the auxiliary patch information, wherein application of the filtering process is at least partially controlled based on said metadata.

6. A non-transitory program storage device readable with a machine, tangibly embodying a program of instructions executable with the machine for performing operations, the operations comprising the method as claimed in claim 5.

7. The non-transitory program storage device according to claim 6, further configured for applying, in response to said metadata indicating that the filtering process shall be applied, said filtering process on said two-dimensional patch either along the decoding of the texture image or along the reconstruction of the three-dimensional representation of said at least one object.

8. The non-transitory program storage device according to claim 6, wherein said metadata further comprises at least one common filter type and a predefined filter strength defined for a plurality of patches, wherein signaling of the at least one common filter type and the further predefined filter strength is carried via at least two syntax elements included in a sequence level syntax structure.

9. A non-transitory program storage device readable with a machine, tangibly embodying a program of instructions executable with the machine for performing operations, the operations comprising the method as claimed in claim 1.

10. The non-transitory program storage device according to claim 9, wherein the metadata further comprises at least one common filter type and a further predefined filter strength that is defined for a plurality of patches.

11. The non-transitory program storage device according to claim 10, wherein signaling of the at least one common filter type and the further predefined filter strength is configured to be carried via at least two syntax elements included in a sequence level syntax structure.

12. The method according to claim 1, wherein the metadata further comprises at least one common filter type and a further predefined filter strength that is defined for a plurality of patches.

13. The method according to claim 12, wherein signaling of the at least one common filter type and the further predefined filter strength is configured to be carried via at least two syntax elements included in a sequence level syntax structure.

14. The method according to claim 5, further comprising:
applying, in response to said metadata indicating that the filtering process shall be applied, said filtering process on said two-dimensional patch either along the decoding of the texture image or along the reconstruction of the three-dimensional representation of said at least one object.

15. The method according to claim 5, wherein said metadata further comprises at least one common filter type and a predefined filter strength defined for a plurality of patches, wherein signaling of the at least one common filter type and the further predefined filter strength is carried via at least two syntax elements included in a sequence level syntax structure.

* * * * *